Oct. 29, 1957  R. A. McCALLUM  2,811,342

CUTTER BAR

Filed March 21, 1956

INVENTOR.
Robert A. McCallum
BY Murray A. Gleeson
ATTORNEY

United States Patent Office 2,811,342
Patented Oct. 29, 1957

2,811,342

CUTTER BAR

Robert A. McCallum, Clarendon Hills, Ill., assignor to Goodman Manufacturing Company, Chicago, Ill., a corporation of Illinois Application March 21, 1956, Serial No. 573,019

6 Claims. (Cl. 262—28)

This invention relates to improvements in cutter bars adapted for use with kerf-cutting machines, and more particularly to an improved cutter bar having a replaceable tip capable of transmitting the reactions thereagainst into the cutter bar frame.

It has sometimes been the practice to fabricate cutter bars from upper and lower spaced plates with web-like spacers which serve to guide the cutter chain between the spaced plates. A tongue near the end of the bar supports a replaceable guide tip, which tongue and tip are usually fastened by rivets between the upper and lower plates. In rough cutting conditions such as in rock the higher forces applied to the tip of the bar act to destroy the joint existing between the tongue and the upper and lower plates. It is to the prevention of such an occurrence that this invention is especially directed.

Accordingly, the structure according to the present invention prevents such an occurrence by establishing a direct line of action between the tip and the end of the cutter chain bar, all such action being in the nature of forces having no moment tending to disturb the connection between the tip and the end of the cutter bar. Such forces against the tip are transmitted by a member acting in direct compression between the tip and the end of the bar so that any of the devices holding the members in assembled relationship are not required to absorb any possible induced shearing forces incident to a force at the tip.

The principal object of this invention is to provide an improved cutter bar having a tip for reversing the runs of the cutter chain trained therearound, such tip being characterized by being able to transmit forces imposed thereon directly to the upper and lower frame members of the cutter bar.

The invention may best be understood by reference to the accompanying drawings, in which.

Figure 4:
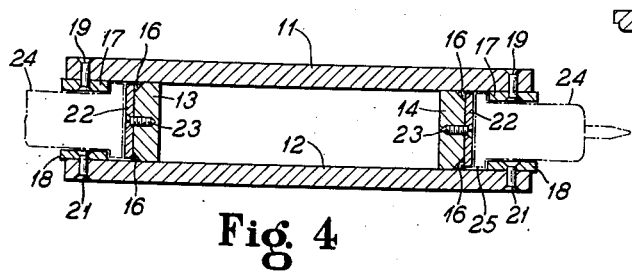
Figure 4 is a cross-sectional view taken along the line 4—4 of Fig. 1, looking in the direction of the arrows.

Referring now to the drawing, there is shown a cutter bar designated generally by the reference numeral 10. The cutter bar 10 consists of upper and lower plates 11 and 12 which are maintained a desired distance apart by web plates 13 and 14. These plates are held to the upper and lower plates as by means of the welds 16 shown. As seen in Fig. 4, the upper and lower plates respectively have riveted thereto upper and lower gibs 17 and 18 held respectively in position by means of countersunk rivets 19 and 21. The outer face of the webs 13 and 14 have each secured thereto wear plates 22 held in position by means of flat-head screws 23 shown.

The wear plates 17 and 18 and 22 provide a guide for the blocks 24 of an endless cutter chain trained for orbital movement around the cutter bar 10. Each block has projections 25 therefrom which are guided between the wear plates 17, 18 and 22.

Figure 3:
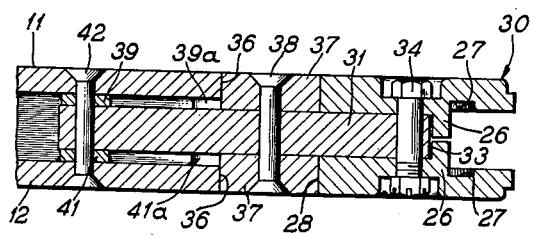
Figure 3 is a sectional view through the double tip shown in Fig. 1, said view being taken along the line 3—3 of Fig. 1, looking in the direction of the arrows.
Figure 5:
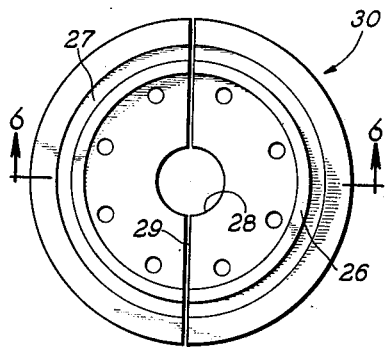
Figure 5 is a plan view of a casting which can be fabricated into a cutter bar tip as shown in Figures 1 to 3.
Figure 6:
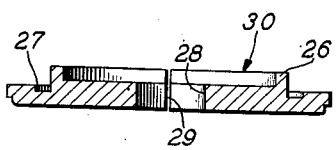
Figure 6 is a sectional view of the casting shown in Fig. 5, showing how it may be separated into two halves prior to being joined together as a cutter tip.

The cutter bar 10 is provided with a cutter bar tip indicated generally by the reference numeral 30, see also Figs. 5 and 6. The cutter bar tip 30 is fabricated from a casting having an annular flange 26 and an annular groove 27. In the casting operation the cutter bar tip is cast as one piece, and after the casting operation the surfaces are finished as seen in Fig. 6 upon a lathe or any other suitable machine tool during which operation a central bore 28 is formed therein. After the lathe operation the casting seen in Figs. 5 and 6 is severed along a diameter 29 to provide two half portions which are placed against a tongue 31 as seen in Fig. 3. The annular grooves 27, 27 provide a slideway for the projections 25 of the cutter chain block 24 seen in Fig. 4.

The tongue 31 has a generally semi-circular face 33 which abuts the annular flanges 26, 26 which are now in confronting relationship. The two halves making up the cutter tip 30 are held to the tongue 31 by means of cap bolts 34, seen in Fig. 3.

Figure 1:
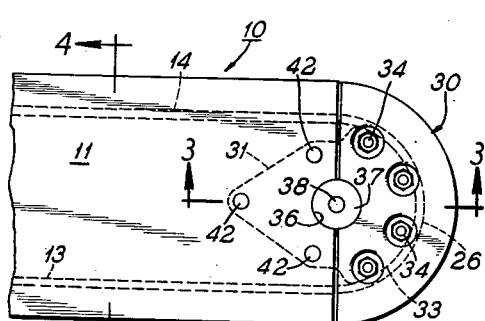
Figure 1 is a fragmentary plan view of a cutter bar section constructed in accordance with this invention.

As seen in Fig. 1 the end of the cutter bar 10 is provided with a semi-circular recess 36 which may be machined in the upper and lower plates 11 and 12 by a boring operation. The recess 36 is of the same radius as the bore 28 in the two halves making up the cutter tip 30. A thrust transmitting bearing member 37 is mounted on opposite sides of the tongue 31 as seen in Fig. 3, and the two bearing members 37 are joined to the tongue 31 as by means of the countersunk rivet 38 on upper and lower sides of the tongue 31.

The assembly consisting of the thrust transmitting bearing members 37, 37 and the tongue 31 together with the cutter tip halves described are joined together as an assembly as seen in Fig. 3. The tongue 31 is guided between the upper and lower plates 11 and 12, being guided by filler members shown, filler members 39 being welded to the underside of the top plate 11 and filler members 41 being welded to the upper side of the lower plate 12. Filler members 39a and 41a have a semi-circular contour corresponding to the semi-circular recess 36 to furnish additional points of bearing for the thrust members 37, 37. The portion of the tongue extending inward of the end of the cutter bar 10 is riveted in position by means of rivets 42 shown in Fig. 2.

Figure 2:
Figure 2 is a side elevation view of the cutter bar of Fig. 1.

It is believed evident from the description foregoing that any thrust against the cutter tip 30 will be transmitted by the thrust transmitting bearing members 37. By reason of the fact that material is lost in parting the cutter tip seen in Figs. 5 and 6 to make two half portions, the assembled cutter tip 30 seen in Figs. 1 and 2 is separated from the end of the cutter bar 10 by a small distance shown. Any thrusts against the cutter tip 30 must perforce be transmitted into the circular thrust transmitting bearing members 37, thereby making it unnecessary for the rivets 42 to take such thrusts.

It has been found that structure according to that described has a useful life far in excess of that experienced with cutter tips according to previous designs.

Figure 7:
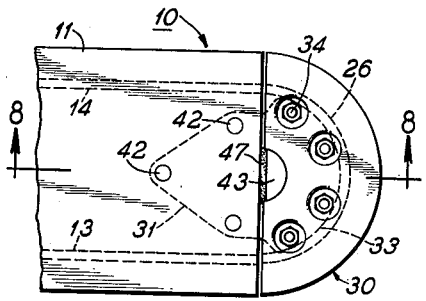
Figure 7 is a plan view of an alternate construction similar to Fig. 1.
Figure 8:
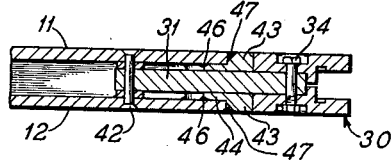
Figure 8 is a sectional view taken along the line 8—8 of Fig. 7 looking in the direction of the arrows.

Referring now to Figs. 7 and 8 of the drawings there is shown another arrangement whereby a cutter bar made in accordance with the previous teachings of the art may be modified so as to have the benefit of the teachings of the invention herein.

Accordingly, the end of the cutter bar 10 has welded thereto a thrust receiving member 43. This thrust receiving member may be fabricated from a piece of round bar stock and placed in a shaper or mill to remove one half of the stock to provide an extension 44 from the remaining semi-circular portion thereof. Such portion 44 is secured to the upper and lower plates 11 and 12 respectively as by welds 46. In such fabrication of the thrust receiving member 43, the same may be suitably shaped to provide for a line weld 47. As with the construction described with references to Figs. 1 to 6 of the drawings the tongue 31 is held to the upper and lower plates 11 and 12 as by means of the countersunk rivets 42.

While the invention has been described in terms of a pair of preferred embodiments thereof the scope of the invention is intended to be limited by the claims here appended.

I claim:

1. In a cutter bar supporting an orbitally movable cutter chain for a kerf cutting machine comprising spaced apart plates, spacing means between said plates, and a replaceable guide joined to the end of the bar and providing a means reversing the direction of the cutter chain; each of said plates having a semi-circular extension on an end thereof; said replaceable guide having a semi-circular indentation therein in cooperating relationship with each of said semi-circular extensions; said extensions and indentations being respectively interengaged, said guide having spaces respectively between it and said plates whereby compressive forces are transmitted directly from said guide to said plates through said extensions.

2. In a cutter bar supporting an orbitally movable cutter chain for a kerf cutting machine comprising spaced apart elongated plates, spacing means between said plates, and a guide joined to the end of the bar and providing a means reversing the direction of the cutter chain; said plates having parti-circular extension means at the ends thereof; said guide having corresponding parti-circular indentation means therein; said extension means and indentation means being respectively interengaged, said guide and plates being spaced apart in the direction of the longitudinal axes of said plates whereby compressive forces are transmitted directly from said guide to said plates through said extension means.

3. In a cutter bar supporting an orbitally movable cutter chain for a kerf cutting machine comprising spaced apart plates, spacing means between said plates, and a tip joined to the end of the bar and providing a means reversing the direction of the cutter chain; each of said plates having parti-circular extension means at an end thereof; said tip comprising half portions each lying in a plane corresponding to the planes of said upper and lower plates, a substantially semi-circular indentation in each half portion, the respective indentation and extension means being in interengaging relationship to transmit forces from the tip into said plates, and each of said plates being spaced from said tip whereby compressive forces are transmitted from the tip to the plates directly through the extension means.

4. In a cutter bar supporting an orbitally movable cutter chain for a kerf cutting machine comprising spaced apart plates, spacing means between said plates, and a replaceable tip joined to the end of the bar and providing a means reversing the direction of the cutter chain; each of said plates having a semi-circular extension on an end thereof; said replaceable tip comprising half portions fabricated from a member of circular configuration which is severed along a diameter thereof with the half portions in confronting relationship, an indentation formed in each half portion, the respective indentation and extension being in interengaging relationship to transmit forces from the half portions into said plates, and each of said plates being spaced from the corresponding half portion whereby compressive forces are transmitted directly from the half portions to the plates through said extensions.

5. The invention as defined in claim 4 wherein said half portions are joined by a tongue member extending between said upper and lower plates.

6. The invention according to claim 5 wherein said tongue is joined to said upper and lower plates.

References Cited in the file of this patent

UNITED STATES PATENTS 2,304,505     Morrow     Dec. 8, 1942